United States Patent Office 3,718,136
Patented Feb. 27, 1973

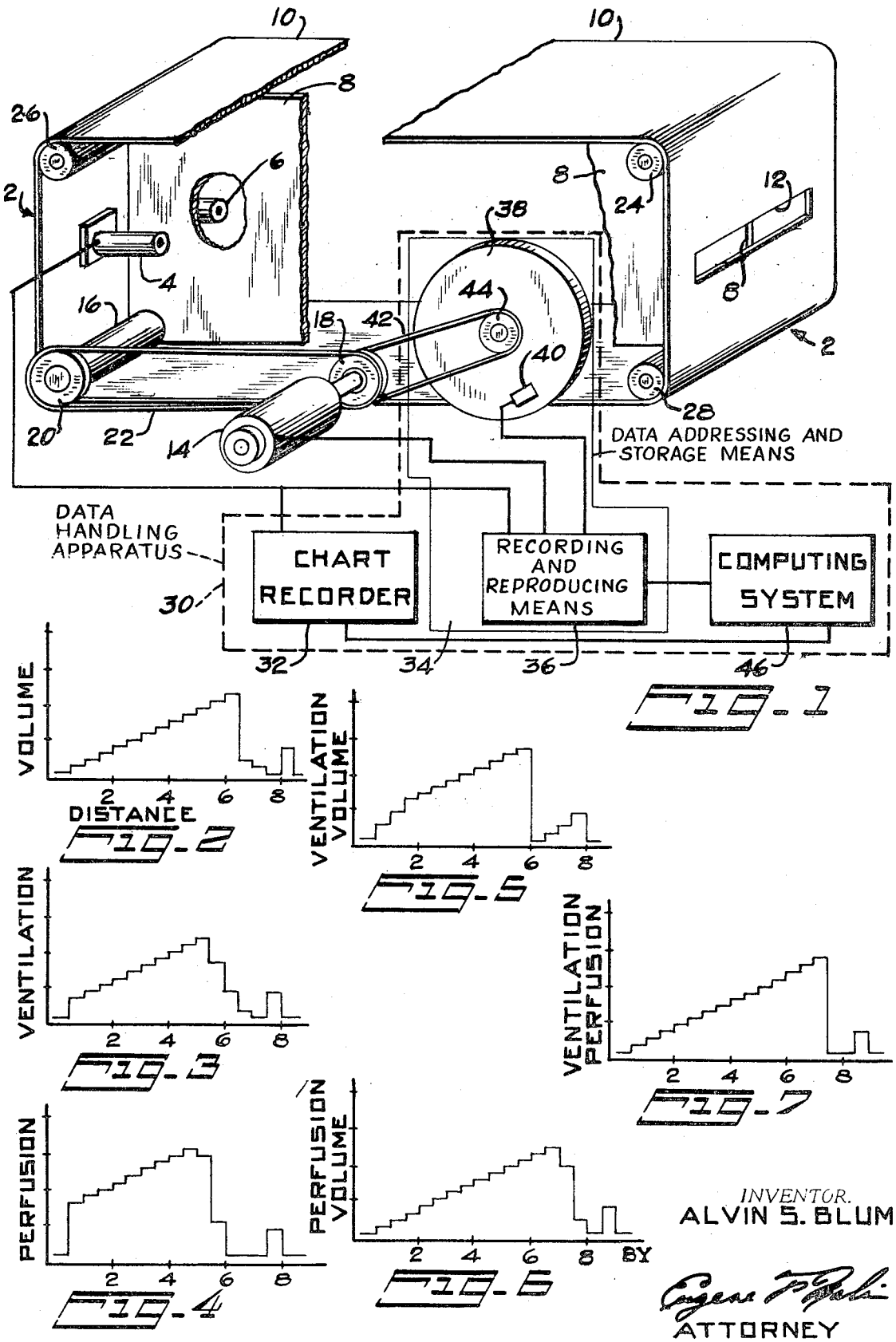

3,718,136
REGIONAL LUNG MEASURING DEVICE
Alvin S. Blum, 700 Palermo Ave.,
Coral Gables, Fla. 33134
Filed Oct. 9, 1968, Ser. No. 766,066
Int. Cl. A61b 5/08
U.S. Cl. 128—2.08                 7 Claims

ABSTRACT OF THE DISCLOSURE

A regional lung measuring device for measuring volume, ventilation and perfusion, and a data handling apparatus for addressing and storing data, displaying data, and computing ratio information. The measuring device includes fixed radiation detectors, and a moving radiation shield with an aperture therein for defining the size of a lung region. The data handling apparatus includes a data addressing and recording means, a chart recorder, and a computing system for computing ratio information from the stored data and for automatically displaying the ratio information in graphic form.

BACKGROUND OF THE INVENTION

This invention relates to a new and improved regional lung measuring device for measuring volume, ventilation and perfusion, and a data handling apparatus for addressing and storing data, displaying data, and computing ratio information and displaying the information.

As is perhaps well-known, the apparatus presently used to obtain regional lung data are complex in design and require considerable data manipulation for interpretation. A plurality of radiation detectors have been used to obtain data from various regions in each lung. Also, moving detectors, that traverse the chest cavity have been used to obtain data from various regions in each lung. In the past, the type of data manipulation devices utilized delay the calculation and presentation of the desired output information. The prior apparatus are costly to manufacture and operate. Automatic results have not been obtained by the prior apparatus.

SUMMARY OF THE INVENTION

This invention relates to a regional lung measuring device and data handling apparatus, and, more particularly, to a regional lung measuring device including fixed radiation detectors and a moving radiation shield with an aperture therein for measuring volume, ventilation and perfusion, and, more particularly, to a data handling apparatus including a data addressing and storing means, a chart recorder for displaying the data, and a computing system for retrieving stored data, computing ratio information, and automatically plotting the derived information in a desirable format in relation to the data for interpretation.

The method of determining regional volume, ventilation and perfusion of each lung in a patient is a non-complex procedure. The patient is positioned by the operator in front of the measuring device with the end of the centrally fixed shield adjacent the length of the spine in order to separate the patient's right and left lung. The regional lung measuring device is placed in a start position. The patient is requested to breath a mixture of radioactive gas and air for a period of time to fill all gas spaces in the lung, and then to hold his breath. The operator initiates the regional volume measuring cycle. The aperture in the movable shield is moved across the lung cavities and the radiation detectors automatically accumulate, display and store the regional volume data from each lung region. The patient then exhausts the gas mixture in the lungs and takes a single breath of radioactive gas. The operator, places the regional lung measuring device in a start position, instructs the patient to hold his breath, then initiates the regional ventilation measuring cycle. The movable shield moves across the lung cavities and the radiation detectors automatically accumulate, display and store the regional ventilation data from each lung region. The patient is requested to exhaust all traces of the radioactive gas. The operator places the regional lung measuring device in a start position, then injects a radioactive solution into the patient's blood stream. After a specific time lapse, the measuring device is activated to move the aperture across the lung cavities. The detectors automatically accumulate, display and store perfusion data from each lung region. Thereafter the computing system is actuated to provide ratio information.

It is an object of this invention to provide a non-complex regional lung measuring device.

It is another object of this invention to provide a non-complex data addressing and storage or recording means.

Another object of this invention is to provide a combination regional lung device, data addressing and storage means, a ratio computing system and means to automatically display the data and computed ratios.

A further object of this invention is to provide a regional lung measuring device having a fixed detector for gathering data from a patient's lung, and a moving radiation shield with an aperture therein for traversing the patient's lung in order to obtain various lung functions.

Another object of this invention is to provide a combination data addressing and storage means for detected regional data, computing means for computing ratio information, and display means for automatic direct plotting of the results of the computation upon a graphic recorder.

A further object of this invention is to provide a data adressing and recording means including a multitrack recording means that is moved in relation to the aperture in the shield in order to address and record each lung function in relation to other lung functions for each region.

An additional object of this invention is to provide a data addressing and recording means, and computing means for providing ratio information from the addressed and recorded regional lung volume, ventilation and perfusion data.

In accordance with these and other objects which will be apparent hereinafter, the instant invention will now be described with particular reference to the accompanying drawing.

DESCRIPTION OF THE DRAWING

In the drawing:

FIG. 1 is a perspective view of the regional lung measuring device, a block diagram of the data handling apparatus;

FIG. 2 is an illustration of the volume data versus the distance from the apex of a lung;

FIG. 3 is an illustration of the ventilation data versus distance from the apex of the lung;

FIG. 4 is an illustration of the perfusion data versus distance from the apex of the lung;

FIG. 5 is an illustration of ventilation per volume ratio versus distance from the apex of the lung;

FIG. 6 is an illustration of perfusion per volume ratio versus the distance from the apex of the lung; and FIG. 7 is an illustration of ventilation per perfusion ratio versus the distance from the apex of the lung.

DESCRIPTION OF THE PREFERRED EMBODIMENT

Referring now in detail to the drawing, wherein an embodiment of the invention is shown, and referring, particularly to FIG. 1, the regional lung measuring device, generally designated as numeral 2, includes fixed radiation detectors 4 and 6, that are separated by a fixed radiation shield 8, and a moving radiation shield 10, in the form of a moving belt. The moving belt 10 includes an aperture 12 that defines the size of the region to be measured by said lung measuring device 2. The aperture 12 is moved across a patient's lung cavities in order to allow the detectors 4 and 6 to detect the radiation emitted from the various regions in each lung. The moving belt 10 and aperture 12 act as a focal plane shutter. The moving belt 10 is driven by means of a motor 14 connected to a drive roller 16 by means of pulleys 18 and 20, and belt 22. The moving belt 10 rotates about drive roller 16, idler rollers 24, 26, and 28, and the fixed shield 8.

The radiation detectors 4 and 6 are connected to the data handling apparatus 30 in order to display and record the various functions of each region of each lung. Volume, ventilation and perfusion data is gathered from each region in each lung of a patient. The data handling apparatus 30 includes a chart recorder 32, a data addressing and storage means, generally designated as 34, and a computing system 46. The chart recorder 32 is connected to the radiation detectors 4 and 6 in order to provide a visual record of the lung functions as the data is detected during the movement of the aperture 12 over the lung cavities. The visual record may be a graphic representation of the radiation intensity over all regions of each lung.

The data addressing and storage means is connected to the detectors 4 and 6, and the drive motor 14. The data addressing and storage means 34 includes recording and reproducing means 36, record disk 38, recording and reproducing heads 40, and drive connecting belt 42 that connects the motor drive pulley 18 to the record disk pulley 44. The motor 14 drives the recording disk 38 relative to the movement of the aperture 12 in the moving belt 10. A computing system 46 is connected to the recording and reproducing means, and the recording and reproducing heads 40 in order to provide ratio information from the recorded data of each lung function. The computing system 46 is connected to the chart recorder 32 for automatic direct plotting of the results of the computation upon the graphic chart 32.

In use, one end of the regional lung measuring device is placed adjacent to a patient's lungs in order to obtain regional volume, ventilation and perfusion data. The patient is positioned by an operator in front of the measuring device with the end of the centrally fixed shield adjacent the length of the spine in order to separate the patient's right and left lung. The detectors 4 and 6, in the lung measuring device, are separated from one another by the centrally fixed radiation shield 8 to restrict the detection field. One detector is positioned to detect radiation emitted from the right lung, and the other detector is positioned to detect the radiation emitted from the left lung. The detectors are located a distance from the lungs so that the detector will detect approximately the same intensity of radioactivity from each particle in a lung, although the radioactive particles in each lung are at different distances from the detector. The field of detection for each detector is restricted further by the moving belt 10, a rubberized, lead belt, that passes in front of each detector. The aperture 12 in the belt moves across each lung cavity from the apex of the lungs to the base of the lungs. The aperture defines the size of the lung region to be measured by the lung measuring device.

In another embodiment of this invention, it should be noted that the moving belt may be replaced by a moving shield, the moving shield may be in the form of a guillotine blade. The blade is moved up or down to expose various regions of each lung.

When the regional lung measuring device is placed in a start position, the aperture is driven to a particular position in relation to the drive roller 16. For example, when the aperture is adjacent the idler roller 24, a switching means, not shown, may indicate that the regional lung measuring device is in a start position. When the switch indicates that the aperture is in the start position, the switch activates a braking means, not shown, to stop the belt. Thereafter, the operator may initiate a particular lung measuring cycle. To prevent the belt from slipping in relation to the rollers, a roller may include sprockets and the belt may include matching sprocket holes.

When the measuring cycle is initiated, the motor 14 drives the moving belt and the aperture across the lung cavities. The motor may also be connected, as shown in FIG. 1, to drive the chart recorder and the record disk in relation to the moving belt. Therefore, the plotting on the chart recorder and the recording on the disk will be in the same sequence with the movement of the aperture on the moving belt as it sweeps across the lung cavities.

In operation, the operator first places the lung measuring device in a start position and orders the patient to breath a mixture of the radioactive gas and air for a period of time to fill all gas spaces in his lungs. The patient equilibrates his lungs by breathing the radioactive mixture for said period of time. The patient is then directed to hold his breath when his lungs are equilibrated with the radioactive mixture. The operator then initiates the regional volume measuring cycle. The regional lung measuring device and the data handling apparatus are activated in order to automatically detect, display and record the intensity of the radioactivity emitted from each region in each lung. The detectors detect the intensity of the radiation as the aperture 12 of the belt passes across the lung cavities. The display on the chart recorder is an automatic direct plotting on the graph of the intensity of the radioactivity detected. The intensity of the radioactivity detected is also stored in a first track on the disk record. The displayed and stored regional quantities of intensity of radioactivity correspond to the volume of each region in each lung.

As the patient exhausts the mixture in his lungs the operator places the regional lung measuring device in a start position. Thereafter, the operator instructs the patient to take a single breath of radioactive gas and to hold his breath when his lungs are filled. At that time the operator initiates the regional ventilation measuring cycle. The regional lung measuring device and the data handling apparatus are activated in order to automatically detect, display and record the intensity of the radioactivity emitted from each region in each lung as the aperture 12 of the belt passes across the lung cavities. The display on the chart recorder is an automatic direct plotting on the graph of the intensity of the radioactivity detected. The intensity of the radioactivity detected is also stored in a second track on the disk recorder that is adjacent to the first track. The displayed and stored regional quantities of radiation correspond to the ventilation of each region in each lung.

The operator again places the lung measuring device in a start position. The patient is requested to exhaust all traces of the radioactive gas. The operator then injects a radioactive solution into the patient's blood stream, and after a specific time lapse initiates the perfusion measuring cycle. The regional lung measuring device and data handling apparatus are activated in order to automatically detect, display and record the intensity of the radioactivity emitted from each region in each lung as the aperture 12 of the belt passes across the lung cavities. The display on the chart recorder is an automatic direct plotting on the graph of the intensity of the radioactivity detected. The intensity of the radioactivity detected is stored in the third track on the disk recorder. The displayed and stored regional quantities of radioactivity correspond to the perfusion of each region in each lung.

The detected data is addressed as it is stored. The volume, ventilation and perfusion data of a particular region of a lung is recorded side by side in the first, second and third tracks, respectively, on the disk. Therefore, the addressed and recorded data is easily located when various regional function data is fed into the computing system to calculate desired ratio information.

After all the functional data for each region of each lung is recorded on adjacent tracks, all breathing maneuvers are completed and the patient is released, and three completed strip chart recordings for each lung are complete, the computer system may be automatically activated to calculate desired ratio information and plot directly the results of the computation upon the graphic chart recorder. The chart recorder may plot three additional graphs as shown in FIGS. 5, 6 and 7.

In FIG. 2, the radiation intensity, reflecting equilibrated lung volume is plotted as one coordinate, versus distance along the lung from apex to base as the second coordinate. This second coordinate is actually derived from a simple time driven chart, but since time represents motion of the aperture on the belt the two may be considered equivalents. In FIG. 3, the radiation intensity, reflecting lung ventilation, is plotted as one coordinate versus distance along the lung from apex to base as the second coordinate. In FIG. 4, the radiation intensity reflecting lung perfusion, is plotted as one coordinate versus distance along the lung from apex to base as the second coordinate.

To obtain ratio information, as shown in FIGS. 5, 6 and 7, the computer system is activated to retrieve the impulse information that has been previously addressed and stored on the disk record. Since the recorded data of various functions from a particular region of each lung lies side by side on the record disk the retrieval process is non-complex. The impulse information is retrieved simultaneously from two recorded tracks. The number of ventilation counts is divided by the number of perfusion counts and the quotient is the desired ratio information. The chart recorder as well as the record disk and aperture in the belt are moving as before during a measuring cycle. The ventilation per perfusion ratio is plotted as one coordinate versus distance along the lung from apex to base of the lung, as the second coordinate, as shown in FIG. 7.

Another embodiment of the storage means, instead of the magnetic disk record, as shown in FIG. 1, is the use of a digital memory bank. This storage means may include a multiplicity of individual digital memories in which individual numbers may be stored therein. In view of the fact that the radiation intensity is reflected by the rate of electrical impulses (pulses per second) from the radiation detectors, and since the aperture on the moving belt is driven at a discrete rate past a region of the lung in order to expose a particular region of the lung to the detector for a discrete length of time, the detected data is a digital measure of the radiation intensity. The impulses from the detectors to the impulse counters, not shown, for a prescribed time interval provide a resulting number that may then be stored in the individual memories at addresses corresponding to position of the aperture from which they may be readily recalled for the subsequent mathematical manipulation.

The instant invention has been shown and described herein in what is considered to be the most practical and preferred embodiment. It is recognized, however, that departures may be made therefrom within the scope of the invention. Therefore, the instant invention is not to be limited to the details discussed herein but to be accorded the full scope of the claims so as to embrace any and all equivalent apparatus and articles.

What is claimed is:

1. A regional lung measuring device comprising,
    a restricted field radiation detecting means for detecting intensity of radiation emissions from a region of an adjacent lung, including at least one radiation detector and a shield means for restricting the field of said radiation detector, said radiation detector and shield means movable relative to one another,
    a drive means operatively connected to said restricted field radiation detecting means to repetitively provide regional radiation data of all regions of the lung, and
    an addressing and storage means connected to said radiation detecting means and said drive means for addressing and storing detected radiation from each region of the lung during each repetitive detection of the lung regions.

2. A regional lung measuring device as set forth in claim 1, wherein said restricted field radiation detecting means includes
    a moving radiation shield in the form of a belt with at least a portion of the belt adapted to be placed between said radiation detector and the adjacent lung for restricting the field of said radiation detector to a particular region of the lung, said belt encompassing an aperture to define each lung region, and
    said drive means connected to said belt to move the aperture in said belt over the entire lung to detect radiation from all regions of the lung during each cycle of operation of the regional lung measuring device.

3. A regional lung measuring device as set forth in claim 2 wherein, said addressing and storage means includes
    a disk record having side by side recording tracks,
    a recording and reproducing head operatively connected adjacent said disk record, and
    a recording and reproducing means connected to said radiation detectors and said head.

4. A combination lung measuring device for measuring regional lung functions and data handling apparatus for displaying data and calculating and displaying ratio information comprising,
    a regional lung measuring device including,
        a restricted field radiation detecting means for detecting intensity of radiation emissions from a region of an adjacent lung, including at least one radiation detector and a shield means for restricting the field of said radiation detector, said radiation detector and shield means movable relative to one another,
        a drive means operatively connected to said restricted field radiation detecting means to repetitively provide regional radiation data of all regions of the lung, and
        addressing and storage means connected to said radiation detector means and said drive means for addressing and storing detected radiation from each lung region during each repetitive operational cycle of the lung regions, and
    a data handling apparatus connected to said regional lung measuring device including,
        display means connected to said regional lung measuring device to automatically display in interpretable form detected regional lung data for each operational cycle, and
        computing means connected to said regional lung measuring device and said display means for computing ratio information from differing regional lung data obtained during various operational cycles to automatically display the ratio information in interpretable form.

5. A combination lung measuring device for measuring regional lung functions and data handling apparatus for displaying data and calculating and displaying ratio information as set forth in claim 4 wherein, said restricted field radiation detecting means includes
    a moving shield connected to said drive means for restricting the field of said radiation detector, at least a portion of said shield adapted to be placed between said radiation detector and the adjacent lung.

6. A combination lung measuring device for measuring regional lung functions and data handling apparatus for displaying data and calculating and displaying ratio information as set forth in claim 5 wherein, said shield is a belt with an aperture surrounded by said belt, and said drive means drives said shield to provide said radiation detector with repetitive views of each region of the lung.

7. A combination lung measuring device for measuring regional lung functions and data handling apparatus for displaying data and calculating and displaying ratio information as set forth in claim 6 wherein, said addressing and storing means includes a disk record with adjacent recording channels, a recording and reproducing head operatively connected to said disk, and a recording and reproducing means connected to said head and said radiation detector.

References Cited
UNITED STATES PATENTS

| | | | |
|---|---|---|---|
| 684,750 | 10/1901 | Fraley | 95—57 |
| 3,221,731 | 12/1965 | Annis et al. | 128—2.05 |
| 3,405,233 | 10/1968 | Anger | 250—71.5 X |
| 3,418,471 | 12/1968 | Gydesen | 250—71.5 |
| 3,428,805 | 2/1969 | Donato et al. | 250—71.5 |

OTHER REFERENCES

Nucleonics, March 1967, vol. 25, No. 3, pp. 52–57.

RICHARD A. GAUDET, Primary Examiner

K. L. HOWELL, Assistant Examiner

U.S. Cl. X.R.

250—71.5 S, 106 T